United States Patent

[11] 3,625,300

[72] Inventors: Bela Barenyi
 Maichingen, Wurttemberg;
 Karl Wilfert, Gerlingen-Waldstadt, both of Germany
[21] Appl. No. 3,263
[22] Filed Aug. 21, 1969
[45] Patented Dec. 7, 1971
[73] Assignee Daimler-Benz Aktiengesellschaft
 Stuttgart-Untertuerkheim, Germany
[32] Priority Aug. 21, 1968
[33] Germany
[31] P 17 80 255.0

[54] SUSPENSION OF AN AXLE UNIT IN MOTOR VEHICLES BY MEANS OF A SUPPORT MEMBER
 32 Claims, 6 Drawing Figs.
[52] U.S. Cl. ............................................... 180/73, 280/124
[51] Int. Cl. .................................................. B60g 3/12
[50] Field of Search .................................... 180/73, 73 D, 73 TL, 73 TT; 280/124.3

[56] References Cited
UNITED STATES PATENTS

| | | | |
|---|---|---|---|
| 2,074,289 | 3/1937 | Wagner | 180/73 R X |
| 2,330,541 | 9/1943 | Barenyi | 180/73 R |
| 3,426,862 | 2/1969 | Wilfert | 180/73 R |
| 3,473,821 | 10/1969 | Barenyi et al. | 180/73 R X |

FOREIGN PATENTS

| 1,114,753 | 5/1968 | Great Britain | 180/73 R |
|---|---|---|---|

Primary Examiner—A. Harry Levy
Attorney—Craig, Antonelli & Hill

ABSTRACT: A suspension for an axle unit in motor vehicles by means of a support structure which enables a pivoting of a wheel pair in relation to the vehicle superstructure about two mutually perpendicular directions; the support structure is formed by an approximately annularly shaped support frame which is elastically connected in one of the axial directions at least at one end, but preferably at both ends thereof at the superstructure.

PATENTED DEC 7 1971  3,625,300
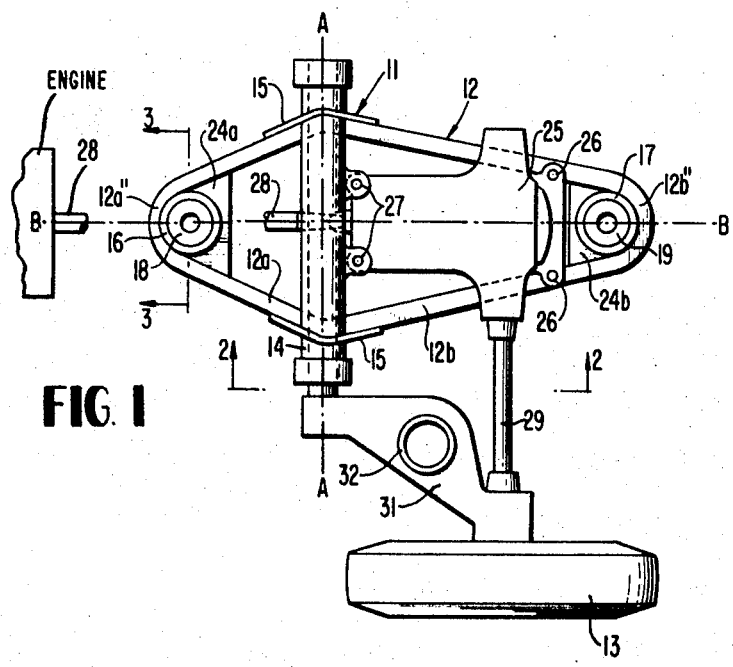
FIG. 1
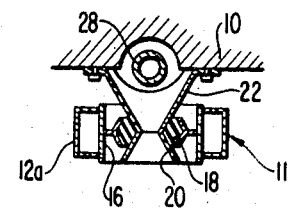
FIG. 3
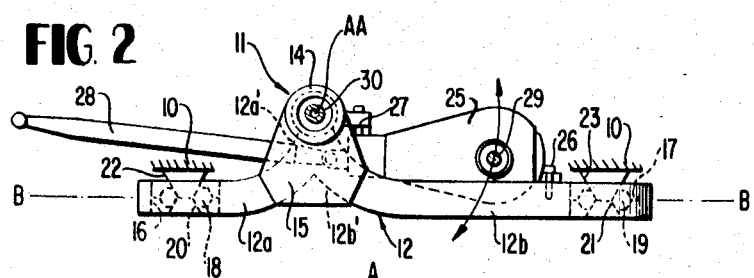
FIG. 2
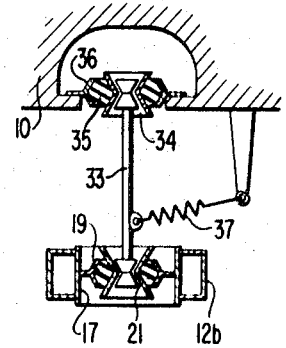
FIG. 4
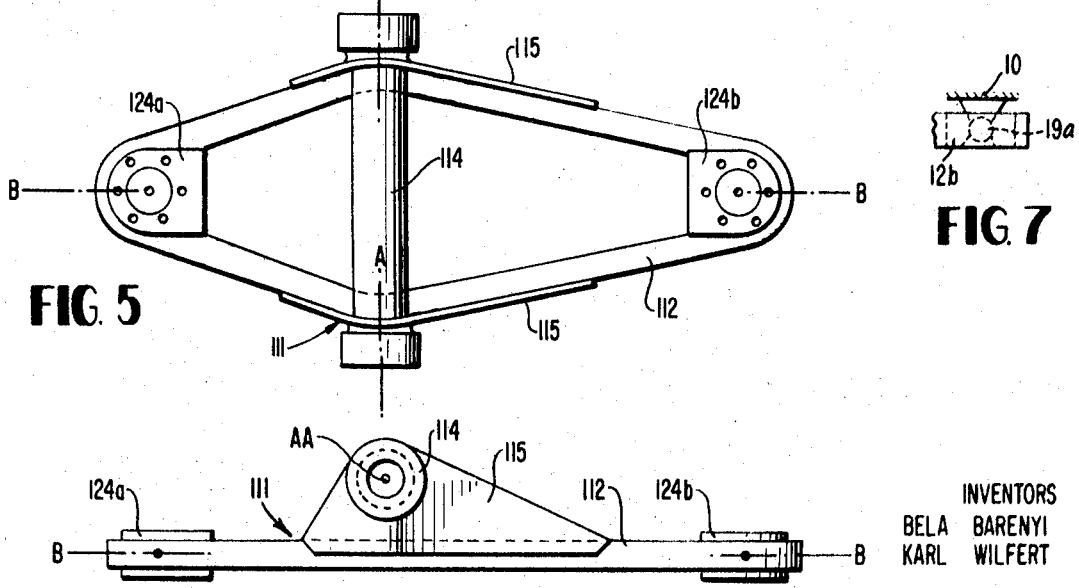
FIG. 5
FIG. 6
FIG. 7
INVENTORS
BELA BARENYI
KARL WILFERT
BY Craig, Antonelli, Stewart & Hill
ATTORNEYS

SUSPENSION OF AN AXLE UNIT IN MOTOR VEHICLES BY MEANS OF A SUPPORT MEMBER

The present invention relates to a suspension of an axle unit in motor vehicles by means of a support member, which permits pivoting of a wheel pair in relation to the vehicle superstructure about two mutually perpendicular essentially horizontal axes, especially in such a manner that the support member is pivotally connected with the vehicle superstructure about a vehicle longitudinal axis and the axle members carrying the wheels are pivotally supported at the support member about a vehicle cross axis parallel or approximately parallel to the wheel center axis.

The aim of the present invention is above all the construction of the support member or structure in such a manner that a stable and sturdy type of construction, a simple assembly and a shock-free and vibration-free connection of the axle unit with the vehicle superstructure is achieved with completely satisfactory spring properties of the vehicle.

Accordingly, the present invention essentially consists in that the support member includes a ring-shaped support frame surrounding the axle gear unit supported thereat, which ring-shaped support frame forms in one axial direction at least at one end thereof, preferably, however, at both ends, bearing eyes for the mounting of rubber bearings, especially rubber rings with vertical axes, for the elastic connection with the vehicle superstructure, and a transverse member crossing the support frame and serving for the bearing support of the swinging axle members.

Preferably, the transverse member crosses the support frame outside of the frame plane, especially above the same, whereby it is reinforced with respect to the support frame by upwardly directed support elements, The support or bracing elements may thereby be formed by the frame members themselves, for example, in such a manner that the support frame is constituted of two half annularly-shaped frame members whose leg ends are cranked or offset out of the support frame plane in the direction toward the transverse member and are connected with each other as well as with the transverse member into a rigid unit. Possibly, the transverse member may also be connected with the support frame by means of reinforcing plates or the like.

In a particularly preferred type of construction of the support frame, the latter is formed of two half frames being approximately V-shaped in plan view, mutually abutting against one another at the transverse member with the leg ends thereof and, for example, welded together. The V-tip or apex of the half-frames thereby forms simultaneously by a corresponding bending a bearing eye for a rubber bearing serving for the connection of the support frame with the vehicle superstructure.

These and further objects, features and advantages of the present invention will become more obvious from the following description when taken in connection with the accompanying drawing which shows, for purposes of illustration only, several embodiments in accordance with the present invention, and wherein:

FIG. 1 is a plan view of an axle suspension in accordance with the present invention;

FIG. 2 is a side view of the axle suspension of FIG. 1, taken in cross section along line 2—2 of FIG. 1;

FIG. 3 is a somewhat schematic cross-sectional view taken along line 3—3 of FIG. 1;

FIG. 4 is a somewhat schematic cross-sectional view of a modified embodiment of the structure illustrated in FIG. 3;

FIG. 5 is a plan view on another embodiment of a support frame in accordance with the present invention;

FIG. 6 is a side elevational view of the support frame of FIG. 5; and

FIG. 7 is a somewhat schematic, partial cross-sectional view of a modified embodiment of the structure illustrated in FIG. 3, utilizing a metal-to-metal universal joint.

Referring now to the drawing wherein like reference numerals are used throughout the various views to designate like parts, and more particularly to FIGS. 1, 2, 3 and 4, reference numeral 10 indicates schematically a conventional vehicle superstructure at which the wheels 13, especially the rear wheels, are so suspended by the interposition of a support member generally designated by reference numeral 12 that the wheels 13 are able to pivot in relation to the vehicle superstructure both about a vehicle longitudinal axis B—B as also about a vehicle cross axis A—A.

In the embodiment according to FIGS. 1 to 4, the support frame 12 is formed by two half-frames 12a and 12b which consist each of a U-shaped support member or the like bent approximately in V-shape and which are cranked upwardly at 12a' and 12b' at the diverging leg ends thereof and are welded at a distance from the main plane of the support frame 12 to a tubularly shaped transverse member 14 into a support unit. Reinforcing plates 15 may be provided for the further reinforcement of the connection between the half-frames 12a and 12b and the transverse bearer 14.

The V-shaped half-frames 12a and 12b are, as can be seen readily from FIG. 1, curved at the V-tips thereof approximately in the form of a half-circle as indicated at 12a'' and 12b'' and together with welded-in annular elements 16 and 17 form bearing eyes for rubber rings 18 and 19 which, in their turn, surround inner ring elements 20 and 21 and by means of which the support member 11 is elastically suspended at the vehicle superstructure 10. The outer ring elements 16 and 17 are constructed for that purpose channel-shaped with a V-cross section open toward the inside and the inner ring elements 20 and 21 are constructed channel-shaped with oppositely directed outwardly open cross section in such a manner that the rubber rings 18 and 19 are clamped between the V-shaped profiles of the inner and outer ring elements. The inner ring elements 20 and 21 form parts of bearing brackets or mounts 22 and 23 that are detachably secured at the vehicle superstructure 10.

Reinforcing plates 24a and 24b reinforce the connection of the outer ring elements 16 and 17 with the half-frames 12a and 12b, respectively.

Inside of this support frame 12 is arranged the axle gear housing 25 which is supported either rigidly or elastically, for example, in two rear points 26 at the half-frame 12b and in two forward points 27 at the crossmember 14. A cardan shaft 28 coming from a forwardly disposed engine and driven thereby, which extends underneath the transverse member 14, drives the axle gear accommodated in the axle gear housing 25 which transmit the drive to the wheels 13 by way of jointed axle shafts 29.

One swinging arm 31 each forming a swinging axial member carrying a respective wheel 13 and pivoting about the axis A—A, is secured at an uninterrupted cross shaft 30 in the tubularly shaped cross member 14; a respective wheel 13 is rotatably support on the correspondingly swinging arm 31. Springs, for example, in the form of coil springs 32 spring support the wheel and/or the swinging arm 31 with respect to the vehicle superstructure 10.

Instead of swinging arms 31 rigidly connected with each other by means of the shaft member 30, swinging arms may also be provided which spring-support the wheels 13 independently of one another in relation to the support member 11. In this case, it is appropriate to interconnect the spring system between the swinging arms and the support member. The two swinging arms 31 may also be connected with each other, instead of being connected by a rigid axle or shaft member 30, by means of a torsion elastic shaft member.

Possibly, the support member 11 may also be elastically connected with the vehicle superstructure 10 only in one point, for example, by means of the rubber ring 18. The other, for example, rear connection takes place in this case, instead of by means of a rubber ring 19, by way of a rigid ball joint 19a or the like as shown in FIG. 7.

FIG. 4 shows a modified construction as compared to that of FIG. 3, for the rear suspension of the support member. The inner ring element 21, instead of being connected directly at the vehicle superstructure 10 is in that case secured at a rod 33 whose connection with the vehicle superstructure 10 is provided, for example, in a similar manner as the connection with the support frame by an inner ring element 34, a rubber ring 35, and an outer ring element 36. Springs 37 of any suitable conventional construction may retain the rod 33 or a corresponding linkage in its center rest position.

Instead of being connected by means of lower and upper rubber rings 19 and 35, the rod 33 or the corresponding linkage may also be connected by means of rigid joints, for example, ball joints, at the support frame, on the one hand, and at the vehicle superstructure, on the other.

The embodiment according to FIGS. 5 and 6 illustrates a support structure generally designated by reference numeral 111 with a plane, ring-shaped support frame 112 and a transverse member 114 which, in contrast to the first embodiment, is connected with the support frame 112, in particular, is welded thereto exclusively by the reinforcing plates 115. The rubber rings (not illustrated in FIGS. 5 and 6) are retained between plates 124a and between plates 124b which are supported against one another, for example, by double-conically shaped bushes corresponding to the inner ring elements 20 and 21.

As to the rest, what has been said in connection with the embodiment according to FIGS. 1 to 4 is equally applicable to the embodiment according to FIGS. 5 and 6.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are within the scope of those skilled in the art.

The claim:

1. A suspension of an axle unit in motor vehicles by means of a support structure that enables a pivoting of a wheel pair in relation to a vehicle superstructure about two substantially mutually perpendicular, approximately horizontal axes, characterized in that the support structure forms, as viewed in plan view, an endless, approximately annularly shaped support frame means surrounding an axle gear unit supported thereat, said support frame means being provided in one axial direction of said two axes at least at one end thereof with bearing eye means for the mounting of an elastic bearing support means providing an elastic connection with the vehicle superstructure, swinging axle means carrying the wheels and pivotally supported at said support frame means about the other axial direction, and a crossmember serving swinging axle means carrying the wheels.

2. A suspension according to claim 1, characterized in that the support frame means is provided in said one axial direction with bearing eye means at both ends thereof.

3. A suspension according to claim 1, characterized in that a respective elastic bearing support means is formed by elastic ring means having a substantially vertical axis.

4. A suspension according to claim 3, characterized in that the support structure is pivotally connected with the vehicle superstructure about a vehicle longitudinal axis corresponding to said one axial direction, and in that the swinging axle means carrying the wheels are pivotally supported at the support structure about a vehicle transverse axis corresponding to the other axial direction and approximately parallel to the wheel center axis.

5. A suspension according to claim 4, characterized in that the support frame means is provided in said one axial direction with one of said bearing eye means at both ends thereof.

6. A suspension according to claim 5, characterized in that said crossmember crosses the support frame means outside of the plane of the frame means and is reinforced with respect to the support frame means by upwardly directed support elements.

7. A suspension according to claim 6, characterized in that the support elements are formed by the frame members of the support frame means itself.

8. A suspension according to claim 7, characterized in that the support frame means is formed of two approximately U-shaped frame members, as viewed in plan view, whose leg ends forming said support elements are cranked out of the support frame means plane in the direction toward the crossmember and are connected with each other as well as with the crossmember into a rigid unit.

9. A suspension according to claim 1, characterized in that the crossmember is connected with the support frame means by reinforcing plate means.

10. A suspension according to claim 1, characterized in that the support frame means is formed of two half-frames approximately V-shaped in plan view, forming at the V-tips thereof said bearing eye means for the elastic bearing support means and with the abutting leg ends securely connected with each other.

11. A suspension according to claim 10, characterized in that the mutually abutting leg ends are connected with each other at the crossmember.

12. A suspension according to claim 1, characterized in that the support frame means is essentially constituted by profile bearer members.

13. A suspension according to claim 12, characterized in that the profile bearer members are inwardly open, U-shaped bearer members.

14. A suspension according to claim 1, characterized in that a drive shaft, which is adapted to connect a driving engine with an axle gear arranged inside of the support frame means and supported thereon, extends between the plane of the support frame means and the crossmember below the latter.

15. A wheel suspension according to claim 1, characterized in that the axle gear unit is supported near one end thereof on both sides of the support frame means and at the other end thereof at the crossmember.

16. A suspension according to claim 1, characterized in that the support structure is elastically connected with the vehicle superstructure only at one end whereas the other end is supported at the vehicle superstructure substantially inelastically and with universal movement.

17. A suspension according to claim 16, characterized in that said one end is the forward and the other end is the rear end.

18. A suspension according to claim 1, characterized in that the support structure is swingingly suspended at one end thereof at the vehicle superstructure by a linkage means, and means for retaining one of the two parts consisting of the linkage means and the support frame means in its center position.

19. A suspension according to claim 18, characterized in that said one end is the rear end, and said means for retaining the part in its center position are springy means.

20. A suspension according to claim 18, characterized in that the linkage means is connected with one of the two parts consisting of support structure and vehicle superstructure by a universal joint.

21. A suspension according to claim 20, characterized in that said universal joint is a rubber joint.

22. A suspension according to claim 20, characterized in that said universal joint is a joint of synthetic resinuous material.

23. A suspension according to claim 20, characterized in that said universal joint is a ball joint.

24. A suspension according to claim 1, characterized in that the elastic bearing support means include elastic rings which are each retained by an inner and an outer metal ring having V-shaped cross sections and with the V-legs thereof directed against one another.

25. A suspension according to claim 1, characterized in that said crossmember crosses the support frame means outside of the plane of the support frame means and is reinforced with respect to the support frame means by upwardly directed support elements.

26. A suspension according to claim 25, characterized in that the support frame means is formed of two half-frames approximately V-shaped in plan view, forming at the V-tips thereof bearing eye means for the elastic bearing support means and with the abutting leg ends securely connected with each other.

27. A suspension according to claim 26, characterized in that a drive shaft, which connects a driving engine with an axle gear arranged inside of the support frame means and supported thereon, extends between the support frame plane and the crossmember below the latter.

28. A wheel suspension according to claim 27, characterized in that the axle gear unit is supported near one end thereof both sides of the support frame means and at the other end thereof at the crossmember.

29. A suspension according to claim 27, characterized in that the support structure is elastically connected with the vehicle superstructure only at one end by said elastic bearing support means whereas the other end is supported at the vehicle superstructure substantially inelastically and with universal movement.

30. A suspension according to claim 29, characterized in that the support structure is swingingly suspended at the other end thereof at the vehicle superstructure by a linkage means, and means for retaining one of the two parts consisting of the linkage means and the support frame means in its center position.

31. A suspension according to claim 30, characterized in that the linkage means is connected one of the two parts consisting of support structure and vehicle superstructure by a universal joint.

32. A suspension according to claim 29, characterized in that the elastic bearing support means includes elastic rings which are each retained by an inner and an outer metal ring having V-shaped cross sections and with the V-legs thereof directed against one another.

* * * * *